US010153678B2

(12) United States Patent
Sørensen et al.

(10) Patent No.: US 10,153,678 B2
(45) Date of Patent: Dec. 11, 2018

(54) LINEAR ACTUATOR

(71) Applicant: LINAK A/S, Nordborg (DK)

(72) Inventors: Rene Sørensen, Gråsten (DK); Jens Jørgen Nielsen, Broager (DK)

(73) Assignee: LINAK A/S, Nordborg (DK)

( * ) Notice: Subject to any disclaimer, the term of this patent is extended or adjusted under 35 U.S.C. 154(b) by 0 days.

(21) Appl. No.: 15/504,986

(22) PCT Filed: Aug. 19, 2015

(86) PCT No.: PCT/DK2015/000034
§ 371 (c)(1),
(2) Date: Feb. 17, 2017

(87) PCT Pub. No.: WO2016/026495
PCT Pub. Date: Feb. 25, 2016

(65) Prior Publication Data
US 2017/0331350 A1 Nov. 16, 2017

(30) Foreign Application Priority Data
Aug. 19, 2014 (DK) .................................. 2014 00457

(51) Int. Cl.
*H02K 7/10* (2006.01)
*H02K 7/06* (2006.01)
(Continued)

(52) U.S. Cl.
CPC ............... *H02K 7/10* (2013.01); *A61G 7/012* (2013.01); *A61G 7/015* (2013.01); *A61G 7/018* (2013.01); *H02K 7/06* (2013.01); *H02K 7/081* (2013.01)

(58) Field of Classification Search
CPC . H02K 7/06; H02K 7/10; H02K 7/081; A61G 7/012; A61G 7/015; A61G 7/018;
(Continued)

(56) References Cited

U.S. PATENT DOCUMENTS 5,329,657 A * 7/1994 Bartley ................ A47C 20/041
5/616
7,066,041 B2 * 6/2006 Nielsen ................ A47C 20/041
74/425
(Continued)

FOREIGN PATENT DOCUMENTS

EP 0763671 A2 3/1997
EP 0944788 A1 9/1999
(Continued)

OTHER PUBLICATIONS

International Search Report for corresponding patent application No. PCT/DK2015/000034 dated Feb. 4, 2016.

*Primary Examiner* — Burton Mullins
(74) *Attorney, Agent, or Firm* — Renner, Otto, Boisselle & Sklar, LLP

(57) ABSTRACT

Linear actuator, where a reversible electric motor (20) through a transmission (21) drives a non-self-locking spindle (22), by means of which an adjustment element (24) secured against rotation can be moved axially for adjusting an element connected thereto such as a backrest section in a bed. The actuator further comprises a quick release (27) for disengagement of the adjustment element (24) from the electric motor (20) and the part of the transmission (21) extending from the electric motor (20) to the quick release (27), such that the spindle (22) is rotated under the load on the adjustment element (24). Further, the actuator comprises brake means for controlling the speed of the adjustment element (24), when the quick release (27) is activated. The brake means are constituted by a rotary damper (45) of the fluid type comprising an internal body located in a liquid-filled hollow in an outer body, where one body is in driving connection with the spindle (22) or the part of the transmission extending from the spindle (22) to the quick release (27), and where a dampening effect, which dampens the
(Continued)

Figure 1:
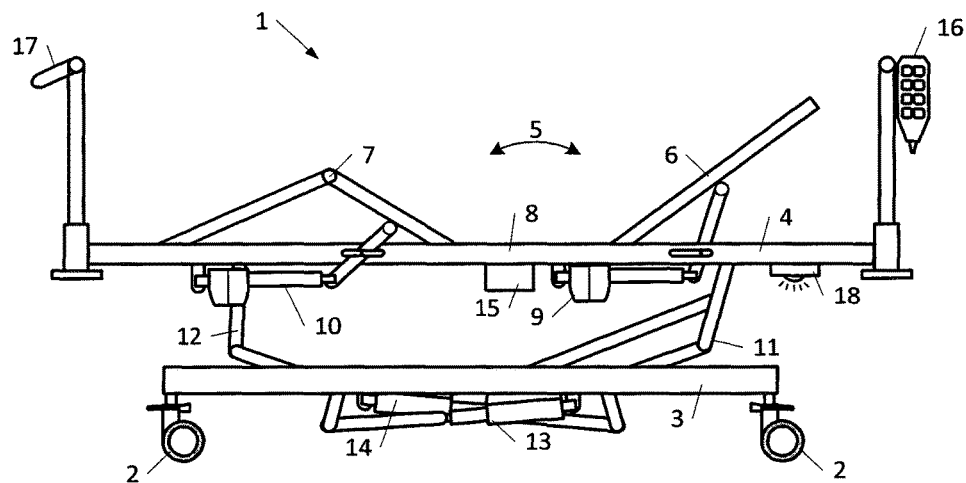

speed of the spindle (22) and thus the adjustment element (24), is generated when this body is rotated relative to the other body as a result of activation of the quick release (27). It is thus possible to provide a construction where the lowering speed is self-controlling when the quick release is activated.

6 Claims, 6 Drawing Sheets

(51) Int. Cl.
*H02K 7/08* (2006.01)
*A61G 7/018* (2006.01)
*A61G 7/012* (2006.01)
*A61G 7/015* (2006.01)

(58) Field of Classification Search
CPC . F16H 9/12; F16H 9/145; F16H 25/20; F16H 25/22; F16H 2025/2068; F16H 2025/2065; F16H 2025/2454; F16H 2025/2071
USPC .......................................................... 74/89.37
See application file for complete search history.

(56) References Cited

U.S. PATENT DOCUMENTS

| | | | |
|---|---|---|---|
| 7,594,450 B2 * | 9/2009 | Wu | H02K 7/06 5/616 |
| 8,091,444 B2 * | 1/2012 | Tseng | F16H 25/2454 188/180 |
| 8,567,011 B2 * | 10/2013 | Talpe | F16F 9/19 16/50 |
| 9,541,146 B1 * | 1/2017 | Wu | F16D 65/22 |
| 2010/0107790 A1 | 5/2010 | Yamaguchi | |
| 2012/0240696 A1 * | 9/2012 | Bastholm | A47C 20/041 74/89.38 |
| 2012/0304787 A1 | 12/2012 | Quenerch'Du | |

FOREIGN PATENT DOCUMENTS

| EP | 1902947 A2 | 3/2008 | |
|---|---|---|---|
| WO | 03/033946 | * 4/2003 | F16H 25/20 |

* cited by examiner

LINEAR ACTUATOR

The invention relates to a linear actuator.

In hospital and care beds the carrying surface for the matrass is divided into a back rest section and a leg rest section as well as typically also a fixed middle section. The back rest and leg rest sections are individually adjustable about a horizontal axis by means of a linear actuator each, cf. e.g. EP 0 498 111 A2 J. Nesbit Evans & Company Ltd.

In certain situation e.g. in case of heart failure it is crucial to be able to immediately lower the back rest section from a raised position to a horizontal position. The speed of a linear actuator is simply too slow to be able to perform the required immediate lowering of the back rest section to a horizontal position. To solve the problem linear actuators with a so-called quick release have been developed, which disengages the spindle itself, which is of a non-self-locking type, from the motor or disengages a part of the transmission in driving connection with the spindle, where this part of the transmission and the spindle are non-self-locking. Examples of linear actuators of this type with quick release are known from e.g. EP 0 577 541 A1, EP 0 685 662 A2, WO 03/033946 A1 and WO 2006/039931 A1 all to LINAK A/S. As mentioned it is noted that the spindle of the linear actuator is not self-locking, so that the load on the tubular adjustment element of the linear actuator, which is connected to the spindle nut, rotates the spindle. The spindle will accelerate as a result of the force from the load, such that the adjustment element with increasing speed moves towards the end position and the back rest section will be suddenly braked in a collision-like manner, when the back rest section reaches its horizontal position. Acceleration towards the horizontal position is enhanced by the construction of the bed, where the load on the linear actuator is smallest when the back rest section assumes its maximum raised position, while the impact of the force is significantly increased the closer the section gets to its horizontal position, where the impact of the force is at a maximum. This collision-like braking can to a great extend be injurious to the patient, who already is traumatized, and further it is a tremendous overload of the bed structure and the linear actuator. As such a traumatic situation on the whole is chaotic around the patient, there is as well a not insignificant risk that someone will get squeezed between the back rest section and the upper frame in which the back rest section is embedded, when this uncontrollably rushes to a horizontal position. The problem is sought to be solved by incorporating gas springs in the bed structure to dampen the movement, but this complicates and adds costs to the construction. This is owing to the fact that the bed structure comprises extra mountings or the like to which the gas springs can be secured. In addition to this the mounting time increases and the gas springs are an added cost. Further, the bed will often be equipped with two gas springs to meet existing requirements. Thus, this solution does not intuitively appear to be the right solution to the problem. This problem is previously realized in EP 0 944 788 B1 to LINAK A/S, which concerns a linear actuator with quick release and brake means for controlling the speed of the spindle when the spindle is disengaged from the motor and transmission. The concrete embodiment shown in EP 0 944 788 B1 deals with a screw spring functioning as a brake spring, which tightens against a fixed contact surface. By a controlled loosening of the engagement of the screw spring against the contact surface, the speed of the spindle can be controlled. The construction is fine, but requires adroitness in order for the operator to be able to control the speed evenly. Moreover, the construction is complicated.

WO2011/066836 A1 to LINAK A/S discloses a construction where this problem of controlling the speed manually is sought to be solved by means of a centrifugal brake, but this construction is likewise rather complicated and does not solve the problem completely satisfactory. EP 1 592 325 B1 to Dewert Antriebs- and Systemtechnik GmbH discloses a construction where a worm gear is mounted to the outer end of the tubular adjustment element of the actuator and a fork-shaped front mounting, said worm gear drives a cone-shaped element in connection with a fixed corresponding cone-shaped brake element. The cone-shaped brake element is spring loaded in engagement with the cone-shaped element, which is driven by the worm gear. By pulling the cone-shaped brake element more or less out of engagement with the cone-shaped element on the worm gear the lowering speed of the tubular adjustment element can be controlled.

It is noted that actuators without a tubular adjustment element are also known, but where the spindle nut is designed as an adjustment element and with which the actuator is secured in the structure in which it is incorporated. An example of such an actuator is known from WO 96/12123 to Dietmar Koch. This type of actuator is typically used in connection with arm chairs or recliners.

A motor drive was developed in the late 1980s for beds for domestic use, where a linear actuator is built into each end of a mutual housing. The motor drive is suspended on the rotary shafts for the back rest and leg rest section of the bed. These rotary shafts are equipped with an arm, which protrudes into the housing and rests loosely against the spindle nut designed as a sliding element. These dual linear actuators have subsequently undergone a further development such that they can be used for care beds. Such a dual linear actuator is e.g. known from WO 89/10715 to Eckhart Dewert and DE 38 42 078 A1 to Niko Gesellschaft für Antriebstechnik GmbH as well as WO 2007/112745 A1 to LINAK A/S. An example of such an actuator with a quick release is dealt with in DE 296 12 493 U1 to Dewert Antriebs- and Systemtechnik GmbH Co KG.

The purpose of the invention is to provide a different solution for a controlled lowering or retraction of an adjustment element when this is disengaged from the motor and the transmission.

The linear actuator according to the invention is characteristic in that the brake means are constituted by a rotary damper of the fluid type comprising an internal body located in a liquid-filled hollow in an outer body, where one body is in driving connection with the spindle or the part of the transmission, which extends from the spindle to the quick release, and where a dampening effect, which dampens the speed of the spindle and thus the adjustment element, is generated when this body is rotated relative to the other body as a result of activation of the quick release.

In a second embodiment of the invention the outer end of the adjustment element on the linear actuator comprises a rotary damper and a quick release, which again is connected to a front mounting. Also this rotary damper is of the fluid type comprising an internal body placed in a liquid-filled hollow in an outer body, where one body is in driving connection with the adjustment element and where a viscous dampening effect, which dampens the speed of the tubular adjustment element, is generated when this body is rotated relative to the other body as a result of activation of the quick release.

For both types of linear actuators it is thus possible to provide a construction where the lowering speed is self-controlling when the quick release is activated, as the dampening coefficient, torque/angular velocity, are increased with increased angular velocity. By testing different types of liquids and their viscosity it has proven that the rotary damper can be made relatively small and possess the desired dampening effect, by which it becomes possible to incorporate the rotary damper into the linear actuator without altering the basic structure. Compared to some of the known solutions mentioned above, one is not obliged to rely on the ability of the operator to control the speed, as the damper automatically adjusts itself to the current speed of the adjustment element. In an embodiment the quick release can be locked in its activated position, such that the operator is able to handle other tasks in the acute situation. When the back rest section reaches its horizontal position it can be designed such that the operation of the quick release automatically is released such that the spindle/the adjustment element is reengaged and the actuator is ready for normal operation.

Expediently, the linear actuator comprises a free wheel bearing, preferably incorporated in the rotary damper and arranged such that the body, which is in driving connection with the spindle or the part of the transmission extending from the spindle to the quick release, stands still, when the adjustment element is moved against the load.

Likewise, the second type of linear actuator can comprise a free wheel bearing arranged such that the body, which is in driving connection with the adjustment element, stands still, when the adjustment element is moved against the load.

For both types of actuator is achieved that they are not affected by a dampening when this has to move the load in the opposite direction of its weight, i.e. neither more energy nor a larger motor is required. A dampening only occurs when the load is moved by means of its weight, typically is lowered.

In another embodiment the free wheel bearing can be integrated in the rotary damper. Thus, the construction, and with it the mounting, is simplified.

Figure 2:
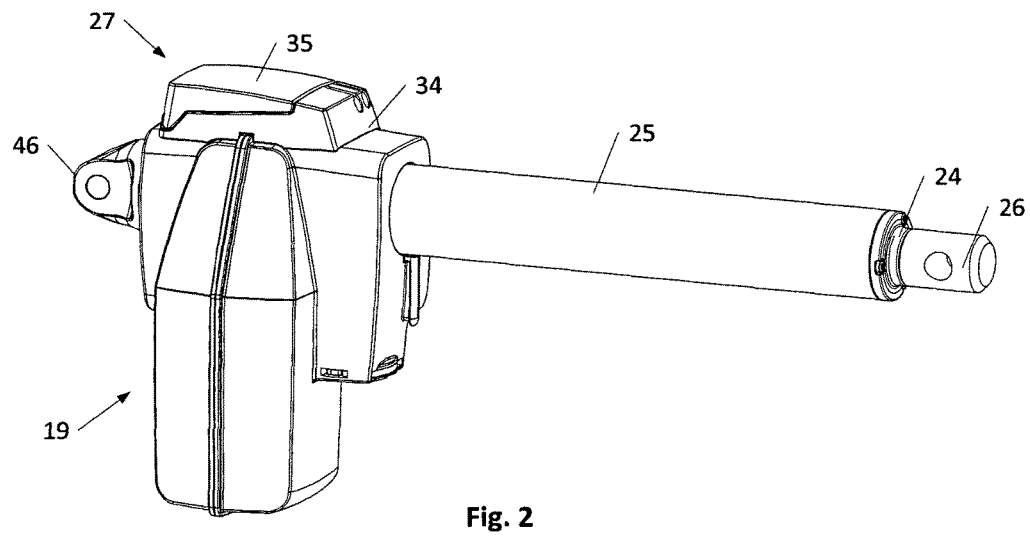
Figure 3:
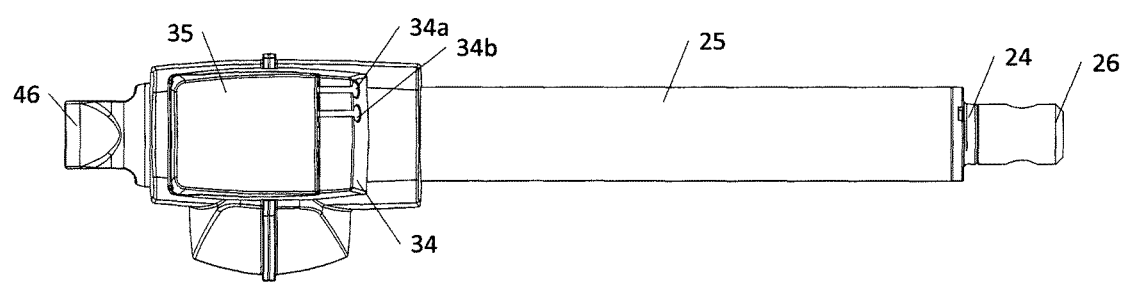
Figure 4:
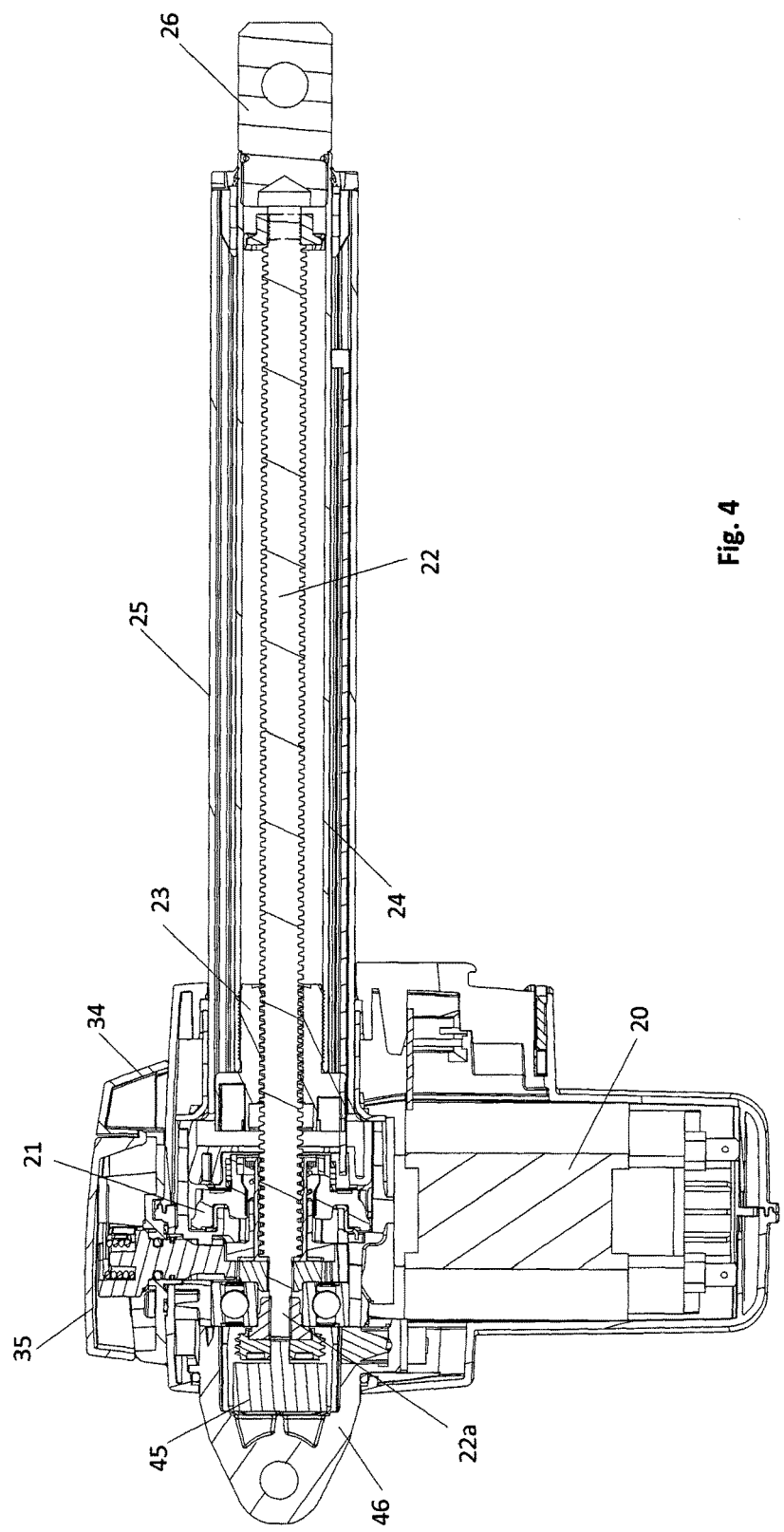
Figure 5:
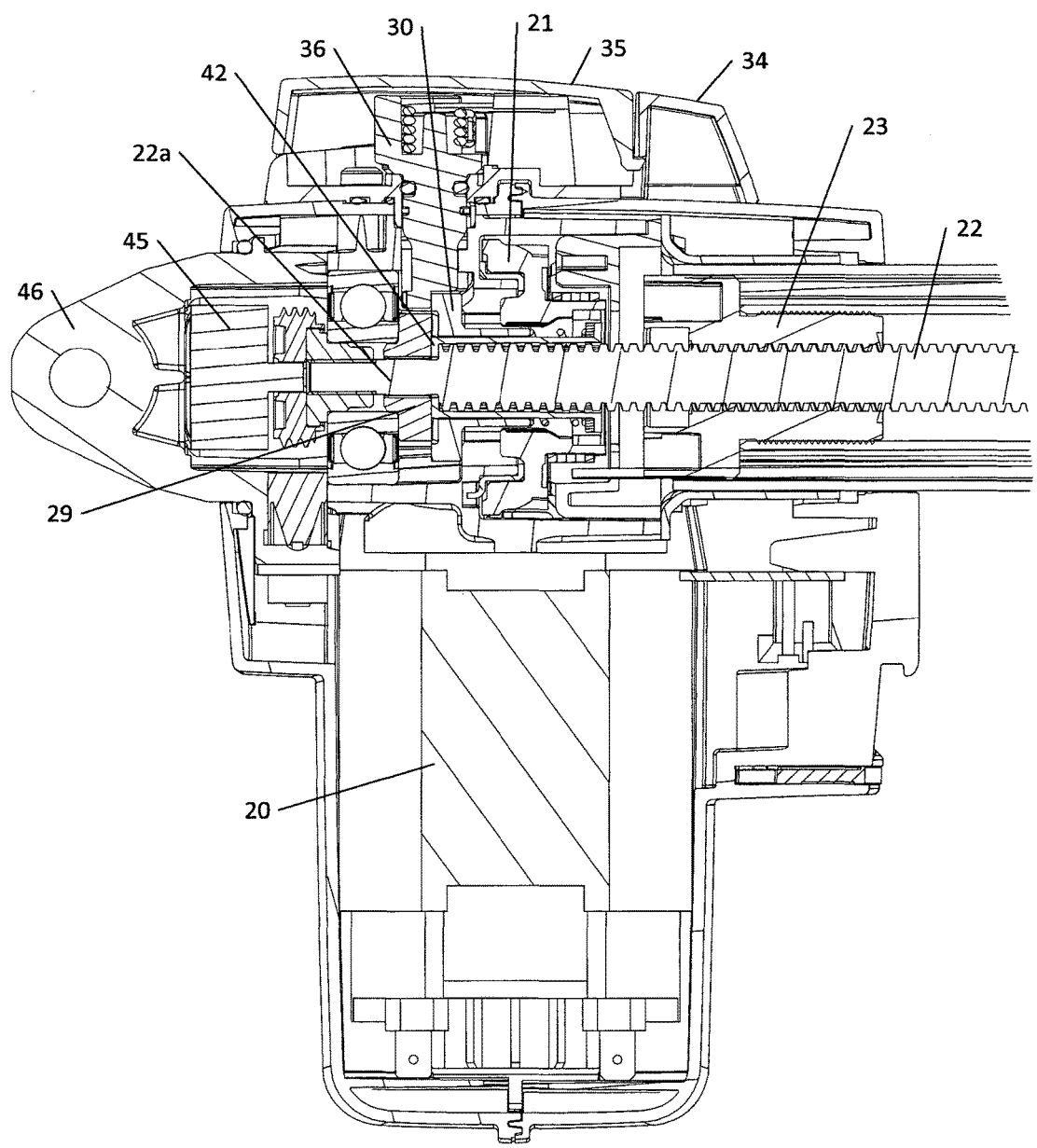
Figure 6:
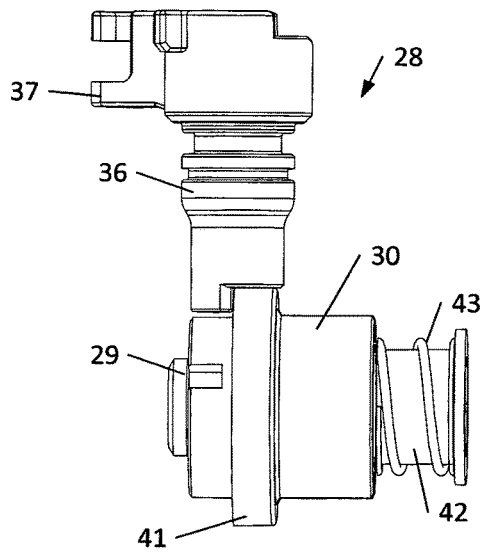
Figure 7:
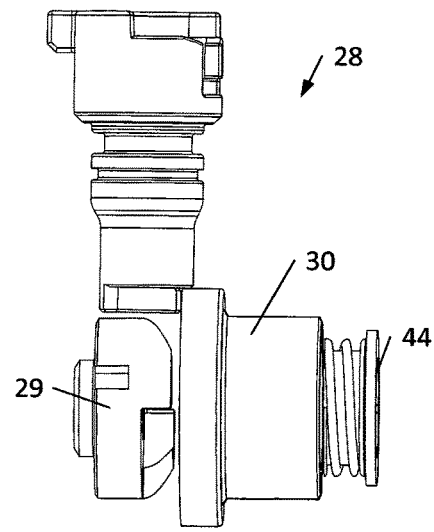
Figure 8A:
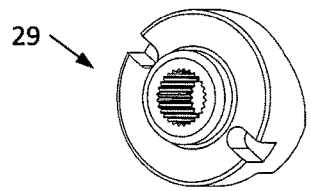
Figure 8B:
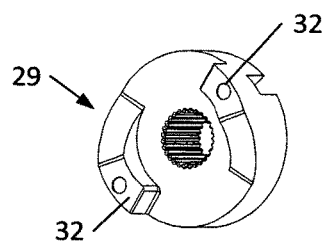
Figure 9A:
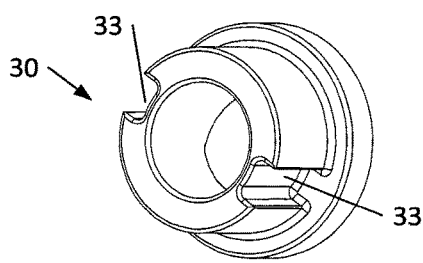
Figure 9B:
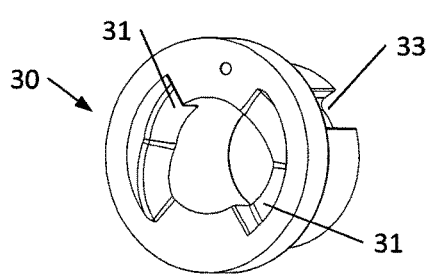
Figure 10:
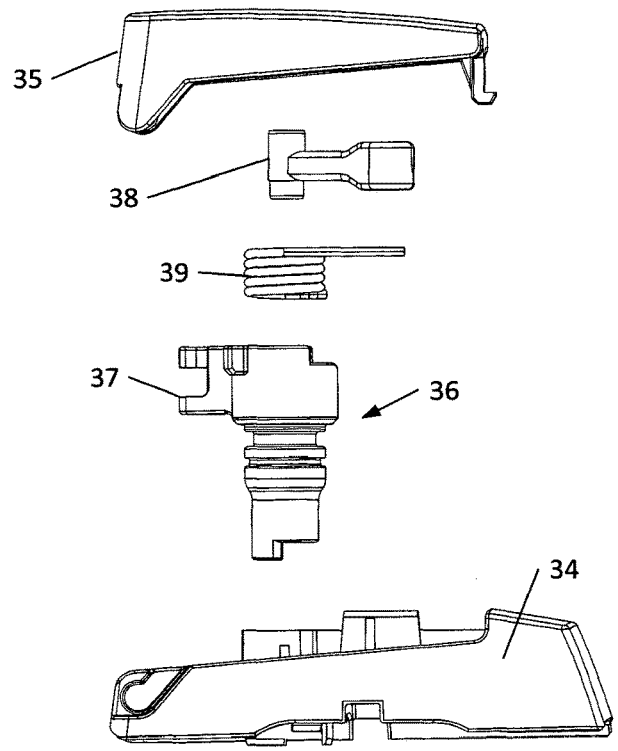
Figure 11:
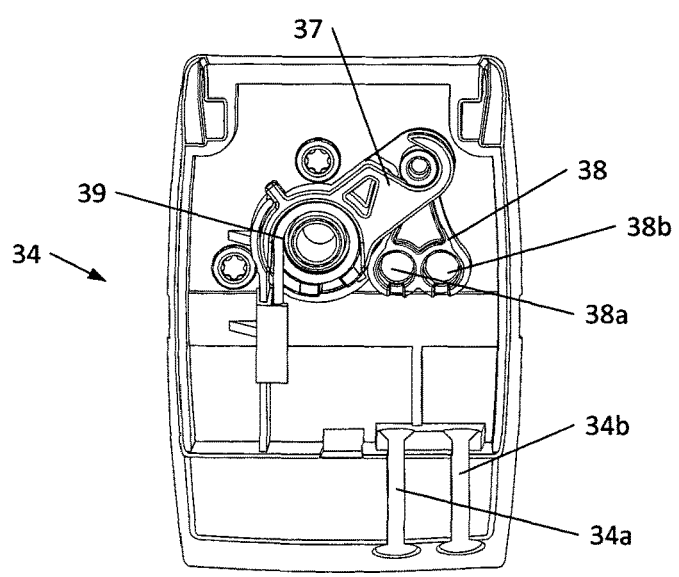
Figure 12:
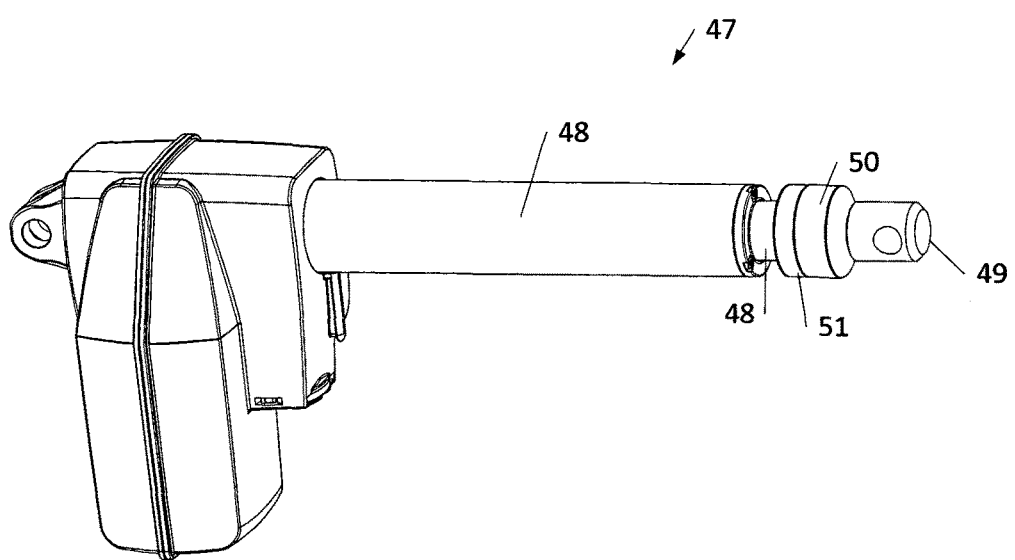

A linear actuator according to the invention will be described more fully below under reference to the accompanying drawing. The drawing shows:

FIG. 1, an outline of a hospital bed,

FIG. 2, a perspective view of a linear actuator with quick release and rotary damper, FIG. 3, a linear actuator with quick release and rotary damper seen from above, FIG. 4, a longitudinal section through the actuator shown in FIG. 2, FIG. 5, a detailed section of the longitudinal section shown in FIG. 4, FIG. 6, parts of the quick release unit in its initial position seen from the side, FIG. 7, parts of the quick release unit in a disengaged position seen from the side, FIGS. 8a and 8b, the inner coupling part seen from each end, respectively, FIGS. 9a and 9b, the outer coupling part seen from each end, respectively, FIG. 10, an exploded view of a release mechanism, FIG. 11, the release mechanism seen from above and into the housing of the quick release unit, and FIG. 12, a schematic construction of a linear actuator.

The hospital bed 1 shown in FIG. 1 of the drawing comprises a lower frame 3 equipped with drive wheels 2 and an upper frame 4. An adjustable carrying surface for the matrass is mounted to the upper frame 4. The carrying surface comprises a back rest section 6, an articulated leg rest section 7 and a fixed middle section 8 between these.

The back rest and leg rest section 6,7 can be adjusted with a linear actuator 9,10 each, such that the carrying surface can assume various contours, indicated by the arrow 5. The upper frame 4 is connected to the lower frame 3 with an articulation 11,12 at each end. The upper frame 4 can be raised and lowered by means of a pair of actuators 13,14 connected to the articulations 11,12. The actuators 9,10;13, 14 are connected to a control box 15 containing a power supply for connection to mains, a rechargeable battery pack as well as a controller. Operating units such as hand controls 16, fixed control panels in guard rails 17 and possibly other periphery equipment such as underbed light 18 is connected to the control box 15.

As it appears from FIGS. 2-11 of the drawing, the linear actuator 9, which moves the back rest section 6, comprises a housing 19 with a reversible electric motor 20, which through a worm gear 21 drives a spindle 22 with a spindle nut 23, to which a tubular adjustment element 24, also called an inner tube, surrounded by an outer tube 25, is secured. A front mounting 26 is located at the end of the tubular adjustment element 24 for mounting of the linear actuator. The actuator concerned is equipped with a quick release unit 27 with a release mechanism 28.

The quick release unit 27 comprises two coupling parts 29,30, where the inner coupling part 29 is mounted on a shaft end 22a of the spindle 22, while the outer coupling part 30 has a hollow 31 (partial cylindrical track) in which a protrusion 32 on the inner coupling part 29 can be received in a torque-transferring connection. The outer side of the outer coupling part 30 further comprises a groove 33 for engagement with a corresponding tongue on the inner side of the through-going hole of the worm wheel 21, such that a torque-transferring connection is also formed here. Thus, the reversible rotation of the electric motor 20 through the worm gear (including the worm wheel 21) and further through the connection between the outer and inner coupling part 29,30 can drive the spindle 22. The spindle nut 24, which is secured against rotation, can thus move back and forth on the spindle 22 depending on the direction of rotation of the electric motor 20.

The quick release unit 27 further comprises a housing 34 with a cover 35, in which the release mechanism 28 is arranged. The housing 34 has two entries 34a,34b for a not shown cable leading to a lever, not shown either. The release mechanism 28 comprises a tubular activation element 36, which partially is led through a hole in the bottom of the housing 34 and thus extends partially into the housing 19 of the linear actuator. The upper end of the activation element 36, which is placed in the housing 34 comprises an arm 37, which extends in a radial direction from the rotation and central axis (see FIGS. 6 and 11) of the activation element 36. The arm 37 of the activation element is connected to a cable holder 38 with two holes 38a, 38b in which a cable, e.g. in the shape of a wire, can be secured. Each of the cables can be guided in the two entrances 34a, 34b, respectively in the housing 34. The upper end of the activation element 36 has a hollow cylindrical part, in which a return spring 39 is arranged. A free end of the winding of the return spring is fixed in a track in the housing 34. Under reference to FIGS. 6, 7 and 11, the activation element 36 will be rotated in a clockwise direction, when a cable is pulled via the arm 37. Concurrently with the pull force in the cable being reduced, the return spring 39 will cause the activation element 36 to rotate in a counter clockwise direction to an initial position.

The lower end of the tubular activation element 36 is partially shortened with a notch, which has a first plane surface perpendicular to the rotation and central axis of the activation element and a second plane surface 40 parallel to the rotation and central axis of the activation element. Seen from the end of the lower end of the activation element 36 the second plane surface 40 forms a chord in the circular section of the activation element.

When the activation element 36 is in its initial position the second plane surface 40 rests against a collar 41 on the outer coupling part 30. In this initial position the outer coupling part 30 is in engagement with the inner coupling part 29. This torque-transferring connection between the two coupling parts 29, 30 is achieved by spring-loading the outer coupling part 30. Thus, the outer coupling part 30 is displaceably arranged on a bushing 42, which further comprises a compression spring 43 placed between an end wall 44 on the bushing 42 and the outer coupling part 30. In this embodiment, the bushing 42 sits across the threads of the spindle 22 in continuation of the shaft end 22a of the spindle, such that the end wall 44 is located farthest away from the shaft end 22a of the spindle.

When the activation element 36 is rotated as a result of a pull in a cable, the second plane surface 40 will displace the outer coupling part 30 in the direction towards the end wall 44 of the bushing and thus compress the compression spring 43. After a given rotation of the activation element 36 the outer coupling part 30 will be displaced so much that the torque-transferring connection is interrupted.

Hereby, the spindle 22 can rotate freely independent of transmission 21 and electric motor 20. The spindle 22, spindle nut 23 and the tubular adjustment element 24 of the actuator will thus be disengaged and the back rest section 6 of the bed will under its load move downwards into its horizontal position.

A rotary damper 45 of the fluid type is connected to the free end of the shaft end 22a of the spindle, which is embedded with a bearing in the housing 19. The rotary damper 45 is mounted in a hollow in a rear mounting 46 on the rear end of the linear actuator. The rotary damper 45 comprises an inner body in the shape of a cylinder placed in a liquid-filled hollow in an outer body, which is also constituted by an outer body. The liquid used in the hollow of the rotary damper 45 is a silicone oil. The inner body is through a shaft end in driving connection with the shaft end 22a of the spindle. When the quick release unit 27 through the release mechanism 28 is activated and the spindle thus is disengaged, this rotates the inner body relative to the outer body. Hereby, a dampening effect is generated, which dampens the speed of the spindle and thus the adjustment element. Based on the maximum load on the actuator, the maximum dampening with which the rotary damper should dampen the speed of the adjustment element 24 can be determined and thus determine a maximum lowering speed. Dampening can be determined based on choice of liquid and its viscosity, as well as the design and size of the inner and outer bodies. An example of a rotary damper is provided in EP 0 763 671 A2 to Illinois Tool Works Inc.

The rotary damper has a built-in free wheel bearing such that the rotary damper is disengaged under normal operation and thus does not interrupt this or require extra energy.

FIG. 12 of the drawing shows a schematic view of a linear actuator 47 according to the invention, which consists of a reversible electric motor, a transmission, a spindle with a spindle nut and a tubular adjustment element (inner tube) 48. At the outer end of the tubular adjustment element 48 is a front mounting 49 for securing of the actuator 47. Between the front mounting 49 and the tubular adjustment element 48 is a quick release 50 connected to a rotary damper 51 of the fluid type. During normal operation of the actuator 47 the front mounting will be fixed relative to the tubular adjustment element 48. By activation of the quick release 50 the tubular adjustment element 48 is disengaged from the front mounting 49, by which the tubular adjustment element 48, e.g. through a bearing connection (not shown), can rotate freely relative to the front mounting 49. A compression force on the front mounting 49 will thus be transferred to the tubular adjustment element 48 and result in this being rotated in an inwards direction. It is noted that the spindle of the actuator is fixed during the rotation of the tubular adjustment element 48. The rotary damper 51 generates a dampening effect, which dampens the rotation and thus the speed, at which the tubular element 48 is moved in the inwards direction.

The invention claimed is:

1. A linear actuator comprising
a reversible electric motor;
a transmission;
a non-self-locking spindle, wherein the electric motor through the transmission drives the non-self-locking spindle;
a spindle nut on the spindle;
an adjustment element secured against rotation, wherein the adjustment element can be moved axially by being connected to or integral with the spindle nut on the spindle;
a quick release for disengagement of the adjustment element from the reversible electric motor and a part of the transmission extending from the reversible electric motor to the quick release, whereby the spindle is rotated under an external load on the adjustment element; and
a brake for controlling a speed of the adjustment element under the external load when the quick release is activated, wherein the brake is a rotary damper of a fluid type having an internal body located in a liquid-filled hollow in an outer body, where one body of the internal body and the outer body is drivingly connected for rotation with the spindle or the part of the transmission which extends from the spindle to the quick release and wherein a viscous dampening effect which dampens a rotation speed of the spindle and thus the speed of the adjustment element is generated when the one body is rotated relative to the other body of the internal body and the outer body as a result of activation of the quick release.

2. The linear actuator of claim 1, further comprising a free wheel bearing arranged such that the one body which is in driving connection with the spindle or the part of the transmission which extends from the spindle to the quick release stands still when the adjustment element is moved against the external load.

3. The linear actuator of claim 2, wherein the free wheel bearing is incorporated in the rotary damper.

4. The linear actuator of claim 1, wherein the one body is axially coupled to a free end of the spindle or the part of the transmission.

5. A linear actuator comprising a reversible electric motor;
a transmission;
a non-self-locking spindle, wherein the electric motor through the transmission drives the non-self-locking spindle;
a spindle nut on the spindle;
an adjustment element secured against rotation, wherein the adjustment element can be moved axially by being connected to or integral with the spindle nut on the spindle;

a quick release for disengagement of the adjustment element from the reversible electric motor and a part of the transmission extending from the reversible electric motor to the quick release, whereby the spindle is rotated under an external load on the adjustment element;

a brake for controlling a speed of the adjustment element under the external load when the quick release is activated, wherein the brake includes a rotary damper of a fluid type having an internal body located in a liquid-filled hollow in an outer body, where one body of the internal body and the outer body is in driving connection with the spindle or the part of the transmission which extends from the spindle to the quick release, and wherein a viscous dampening effect which dampens a rotation speed of the spindle and thus the speed of the adjustment element is generated when the one body is rotated relative to the other body of the internal body and the outer body as a result of activation of the quick release; and a free wheel bearing arranged such that the one body which is in driving connection with the spindle or the part of the transmission which extends from the spindle to the quick release stands still when the adjustment element is moved against the external load.

6. The linear actuator of claim 5, wherein the free wheel bearing is incorporated in the rotary damper.

* * * * *